United States Patent
Pilhoefer et al.

(10) Patent No.: US 6,774,564 B1
(45) Date of Patent: Aug. 10, 2004

(54) METHOD FOR MOUNTING THE BASE OF AN ELECTRIC LAMP

(75) Inventors: Bernd Pilhoefer, Graben (DE); Ruediger Diekmann, Dillingen (DE)

(73) Assignee: Patent-Treuhand-Gesellshaft fuer Elektrische Gluehlampen, Munich (DE)

( * ) Notice: Subject to any disclaimer, the term of this patent is extended or adjusted under 35 U.S.C. 154(b) by 695 days.

(21) Appl. No.: 09/744,947
(22) PCT Filed: Jun. 14, 2000
(86) PCT No.: PCT/DE00/01935
    § 371 (c)(1),
    (2), (4) Date: Jan. 31, 2001
(87) PCT Pub. No.: WO01/01437
    PCT Pub. Date: Jan. 4, 2001

(30) Foreign Application Priority Data

Jun. 23, 1999 (DE) .......................... 199 28 419

(51) Int. Cl.⁷ ............................... H01J 17/18
(52) U.S. Cl. ........................................ 313/624
(58) Field of Search ............... 313/312, 491, 313/493, 623–625, 634, 635

(56) References Cited

U.S. PATENT DOCUMENTS

| | | |
|---|---|---|
| 4,171,499 A | 10/1979 | Scherzer |
| 5,289,079 A | 2/1994 | Wittmann |
| 6,555,963 B1 * | 4/2003 | Snijkers-Hendrickx et al. ............... 313/638 |
| 6,583,551 B2 * | 6/2003 | Snijkers-Hendrickx et al. ............... 313/493 |
| 6,657,389 B2 * | 12/2003 | Saitou et al. ............... 313/633 |

FOREIGN PATENT DOCUMENTS

| | | |
|---|---|---|
| DE | 67 53 343 | 8/1968 |
| DE | 1 923 665 | 11/1969 |
| DE | 27 21 924 | 11/1978 |
| EP | 467 062 | 1/1992 |
| EP | 455 994 | 3/1994 |
| EP | 452 743 | 9/1994 |
| FR | 2 308 197 | 11/1976 |
| GB | 2 023 356 | 12/1979 |

* cited by examiner

Primary Examiner—William Oen
(74) Attorney, Agent, or Firm—Carlo S. Bessone

(57) ABSTRACT

The invention relates to a method for capping an electric lamp which has a lamp cap with at least one thermoplastic synthetic cap part (21). In particular, the invention relates to a method for cementless capping of a compact fluorescent lamp. According to the invention, the lamp vessel (1) is sealed with the aid of the thermoplastic synthetic cap part (21) by heating sections (101, 102) of the lamp vessel (1) above the softening point and preferably above the melting point of the thermoplastic, and introducing them into constricted cutouts (210) in the thermoplastic synthetic cap part (21). The heated lamp vessel sections (101, 102) soften or melt and displace the synthetic material in the region of the constricted cutouts (210). The lamp vessel (1) is embedded in the set synthetic in a self-closed fashion after the polymer melt has been allowed to set.

11 Claims, 3 Drawing Sheets

METHOD FOR MOUNTING THE BASE OF AN ELECTRIC LAMP

Figure 1:
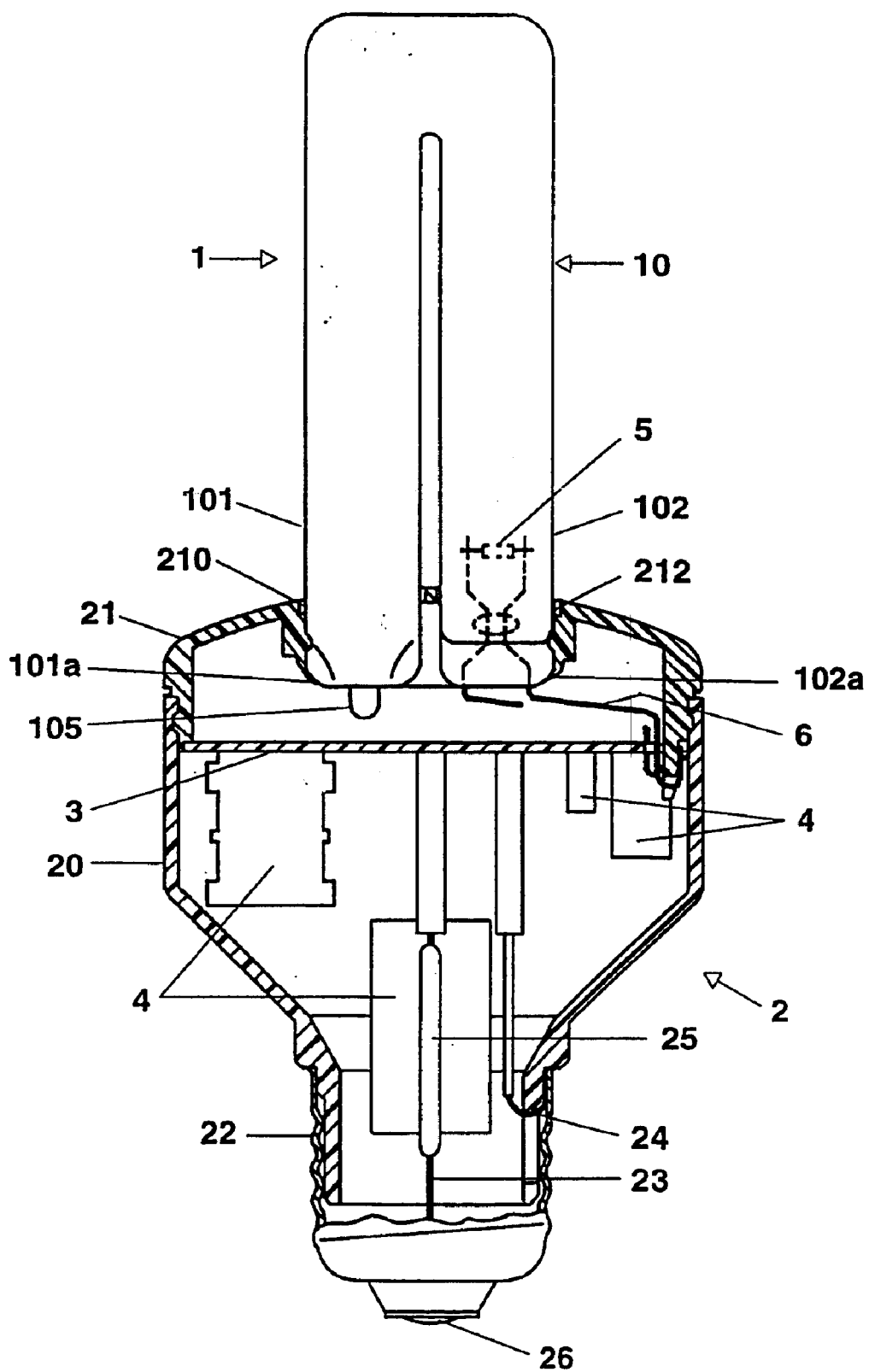

The invention relates to a method for capping an electric lamp in accordance with the preamble of Patent Claim 1.

I. PRIOR ART

Such a method for capping an electric lamp is disclosed, for example, in European patent specification EP 0 455 884 B1. This patent specification describes the capping of a high-pressure discharge lamp capped at one end, in the case of which a tubular extension of the discharge vessel is sealed in a thermoplastic synthetic cap part with the aid of a means capable of high-frequency-induced heating.

II. SUMMARY OF THE INVENTION

It is the object of the invention to specify a method for capping an electric lamp, which method is simplified by comparison with the prior art.

This object is achieved according to the invention by means of the characterizing features of Patent Claim 1. Particularly advantageous designs of the invention are described in the subclaims.

The capping method according to the invention can be applied to electric lamps which have a lamp cap provided with a thermoplastic synthetic cap part, and at least one lamp vessel which is connected to the thermoplastic synthetic cap part by a fused bond. According to the invention, this fused bond is produced by heating sections or parts of the at least one lamp vessel to a point which is greater than or equal to the softening point and, advantageously, greater than or equal to the melting point, of the thermoplastic synthetic cap part material, and by inserting the heated lamp vessel sections into at least one holder of the synthetic cap part, the dimensions of which holder are smaller than the corresponding external dimensions of the lamp vessel sections to be fastened in the holder. When the heated lamp vessel sections are being inserted into the at least one holder, the synthetic cap part material is softened or melts by contact with the heated lamp vessel sections, and the softened plastic or the polymer melt is displaced by the penetrating lamp vessel sections. In this way, the initially too narrow holder is widened and matched to the external dimensions of the lamp vessel sections penetrating into it. After the softened plastic or polymer melt has been allow to set, the at least one lamp vessel is surrounded in a self-closed fashion by the set synthetic material. The set synthetic material advantageously forms a ring-shaped collar surrounding the at least one lamp vessel in a self-closed fashion. The ring-shaped collar enlarges the contact area between the at least one lamp vessel and the synthetic cap part and thereby increases the stability of the fused bond. In order for the production of the fused bond according to the invention to use up as little time as possible, the lamp vessel sections are preferably heated to a point which is even substantially above the melting point of the thermoplastic synthetic cap part material, but also substantially below the melting point of the discharge vessel.

In order to reduce the risk of the occurrence of cracks in the at least one lamp vessel during the sealing method according to the invention, before the heated lamp vessel sections are inserted into the at least one holder, the synthetic cap part is advantageously preheated to a point which is above room temperature and below the softening point of the synthetic cap part material. It is advantageous to accelerate the setting of the plastic by cooling the sealing region, preferably by means of an airflow. In order to increase the strength of the fused bond, the at least one lamp vessel is advantageously provided with at least one indentation, and the heated lamp vessel sections are inserted into the at least one holder in such a way that the at least one indentation is embedded in the set synthetic material in a self-closed fashion after the setting of the plastic. The at least one holder is advantageously designed as a depression or cutout in the thermoplastic synthetic cap material, and the at least one lamp vessel is of U-shaped design, the limbs of the at least one U-shaped lamp vessel being sealed in a depression or a cutout in the synthetic cap part.

The capping method according to the invention can be applied with particular advantage in the case of fluorescent lamps which have a synthetic cap and a discharge vessel which comprises at least one U-shaped glass tube. Usually, with such fluorescent lamps, which are frequently also denoted as compact fluorescent lamps, the discharge vessel is fixed by means of a cement ring in a depression or a cutout in a cap-type synthetic cap part. Such a lamp is described, for example, in patent specification EP 0 452 743 B1. The application of the capping method according to the invention to the aforementioned fluorescent lamps permits cement to be dispensed with. The fluorescent lamp according to the invention is therefore distinguished by a lamp cap which has at least one thermoplastic synthetic cap part which has a permanent fused bond with the limbs of at least one U-shaped glass tube which is a constituent of the discharge vessel of the lamp. The at least one thermoplastic synthetic cap part is advantageously designed as a cap through which the limbs of the at least one U-shaped glass tube are led, and which has on the inside ring-shaped collars which surround the limbs of the at least one U-shaped glass tube in a self-closed fashion. The cap advantageously closes off a lamp cap which is of pot-type design and in which a ballast is arranged for operating the fluorescent lamp.

III. DESCRIPTION OF THE PREFERRED EXEMPLARY EMBODIMENT

Figure 2:
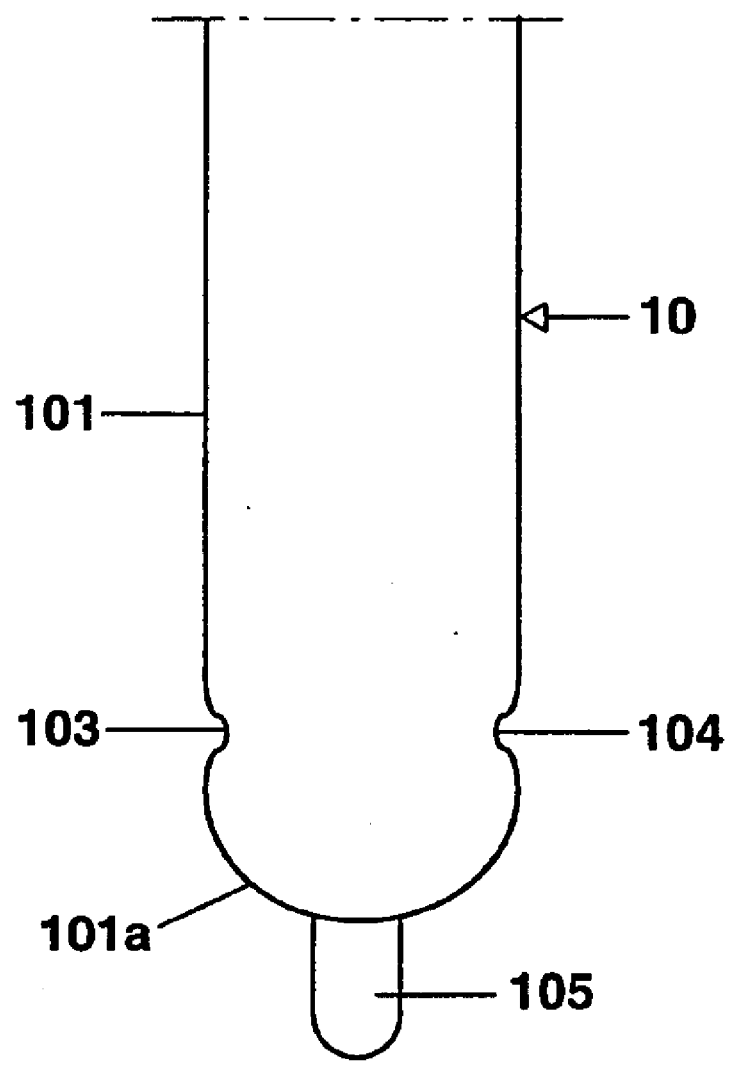
Figure 3:
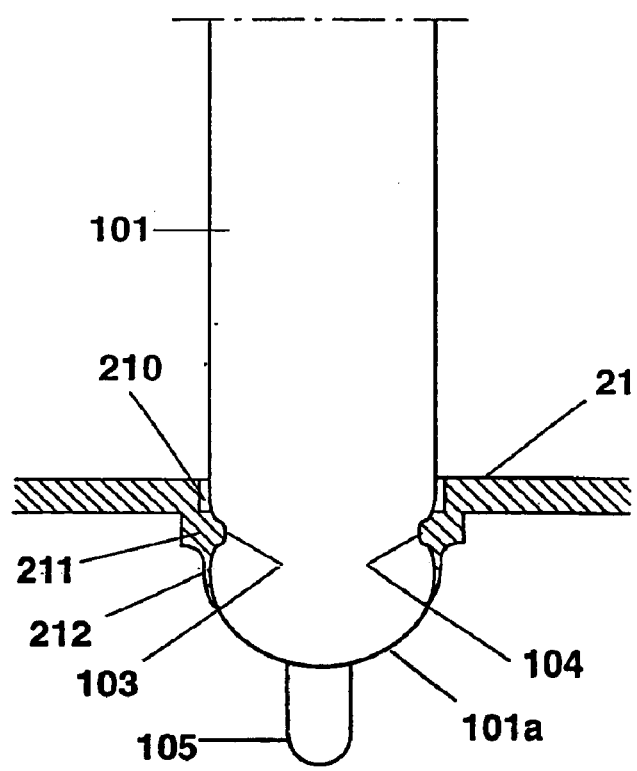
Figure 4:
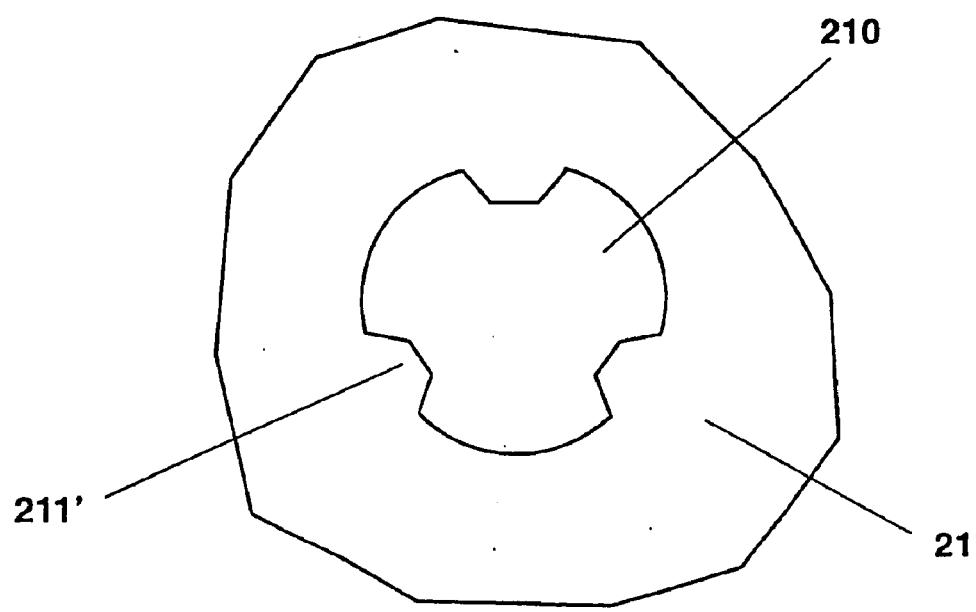

The invention is explained in more detail below with the aid of a preferred exemplary embodiment. In the drawing:

FIG. 1 shows a diagrammatic, partially sectioned side view of a preferred exemplary embodiment of a fluorescent lamp according to the invention, FIG. 2 shows a diagrammatic and partially sectioned representation of a detail of the thermoplastic synthetic cap part and of the lamp vessel before the sealing process, FIG. 3 shows a diagrammatic and partial representation of a detail of the thermoplastic synthetic cap part and of the lamp vessel after the sealing process, and FIG. 4 shows a top view of a bushing through the thermoplastic synthetic cap part in accordance with a second exemplary embodiment of the invention.

The capping method according to the invention is described below with the aid of a fluorescent lamp, in particular with the aid of a compact fluorescent lamp. The application of the capping method according to the invention offers most advantages in conjunction with compact fluorescent lamps, but is not limited to this type of lamp. FIG. 1 shows a fluorescent lamp according to the invention in which use has been made of the capping method according to the invention. This fluorescent lamp is a so-called compact fluorescent lamp which can be inserted into an E27 screw cap holder as a substitute for a general-lighting service lamp.

This fluorescent lamp has a discharge vessel 1 which comprises two U-shaped glass tubes 10, which are connected to one another by a transverse web (not illustrated) and of which only one is visible in the side view of FIG. 1. The discharge vessel 1 therefore has only one discharge space. Moreover, the fluorescent lamp has a synthetic cap 2 which comprises a pot-type lower part 20 and a cap 21. Arranged in the lower part 20 is a mounting plate 3 on which virtually all the components 4 of a ballast for operating the fluorescent lamp are fastened. The lower part is provided, furthermore, with a metal E27 screw cap shell 22. Power is supplied to the ballast by means of two supply leads 23, 24 of which the first 23 is connected by a fuse 25 to the contact plate 26 of the screw cap, and the second is connected to the cap shell 22. The cap 21 is fastened on the lower part 21, and closes the cap 2. It 21 comprises the thermoplastic synthetic polybutylene terephthalate B 4235 GF30. This synthetic has a glass fibre component of approximately 30 percent. It has a melting point of 225 degrees Celsius, and its softening point is at 210 degrees Celsius. The cap 21 has four cutouts 210 through which in each case one limb 101, 102 of a U-shaped glass tube 10 is led. The limbs 101, 102 have sealed ends 101a, and form a permanent fused bond with the cap 21. The limb 101 is provided with an exhaust tube 105 which serves to evacuate the discharge vessel 1. Located in the interior of the discharge vessel 1 are two lamp electrodes 5 which serve to generate a low-pressure gas discharge and which are connected in each case to the ballast by two lamp supply leads 6 projecting from the discharge vessel 1.

A part of the cap 21 with one of the four cutouts 210 is illustrated in FIGS. 2 and 3. The capping method according to the invention is described in more detail below with the aid of these figures. Each cutout 210 of the cap 21 is designed as a circular opening with a diameter which is constricted in steps. On the outside of the cap 21, the diameter of the cutout 210 is slightly larger than the outside diameter of the limb 101 of the U-shaped glass tube 10. On the inside of the cap 21, the cutout 210 has a diameter which is smaller by approximately 0.6 mm than the outside diameter of the limb 101 of the U-shaped glass tube 10. This stepped constriction of the cutout 210 is produced by a ring-shaped bead 211 on the inside of the cap 21. The limb 101 has two indentations 103, 104 situated opposite one another.

In order for the prefabricated discharge vessel 1, which is provided with the electrodes 5 and sealed in a gastight fashion, to be fixed in the cap 21, the cap 21 is preheated to a temperature of approximately 150 degrees Celsius, and the limbs 101, 102 of the U-shaped glass tubes 10 of the prefabricated discharge vessel 1 are heated in the region of their ends 101a, 102a to a temperature of approximately 350 degrees Celsius. The heated limbs 101, 102 are inserted, from the outside of the cap 21, into the corresponding openings 210 in the cap. The contact with the hot glass walls of the limbs 101, 102 softens and melts the synthetic material forming the beads 211. The softened and melted synthetic material is partially displaced by the limbs 101, 102, penetrating into the openings 210, of the U-shaped glass tube 10. As a result, the cutouts 210 are widened in the region of the beads 211 such that their diameter corresponds to the outside diameter of the limbs 101, 102. After being permitted to set, the displaced polymer melt forms a ring-shaped collar 212 which surrounds the limbs 101, 102 in a self-closed fashion. The limbs 101, 102 of the U-shaped glass tubes 10 are inserted so deeply into the cutouts 210 that the indentations 103, 104 are wetted by the polymer melt and are embedded in the set synthetic of the beads 211 or the collars 212 after setting of the polymer melt. The mounting of the mounting plate 3 and of the components 4 of the ballast in the lower part 20, and the fitting of the cap shell 22 and its making contact with the supply leads 23, 24 are performed in the usual, known way. After the mounting of the mounting plate 3 and the components 4 of the ballast, the structural unit composed of the cap 21 and the discharge vessel 1 is connected to the lower part 20.

The invention is not limited to the exemplary embodiment explained in more detail above. For example, instead of the stepwise constricted cutouts 210, the cap 21 can also have conically constricted cutouts. Instead of being realized by beads 211, the constriction of the cutouts 210 can also be realized with the aid of webs 211' or knobs (FIG. 4) which extend radially into the respective bushing 210. Upon insertion of the heated sections of the discharge vessel 1, these webs 211' or knobs are melted and the polymer melt is displaced by the penetrating discharge vessel 1. After the setting of the polymer melt, the discharge vessel 1 is sealed in the cap 21. It may be mentioned further at this juncture that a fused bond of sufficient strength is achieved even without the indentations 103, 104. The indentations 103, 104 are required only when an exceptionally high strength is desired for the connection between the discharge vessel and cap.

The capping method according to the invention is not limited to compact fluorescent lamps, but can, for example, also be applied to tubular fluorescent lamps, which are fitted with thermoplastic synthetic cap parts at their two ends, and to incandescent lamps whose caps have thermoplastic synthetic parts.

What is claimed is:

1. Method for capping an electric lamp which has a lamp cap (2) provided with a thermoplastic synthetic cap part (21), at least one lamp vessel (1) and at least one illuminating means arranged in the at least one lamp vessel (1), the at least one lamp vessel (1) being sealed in the synthetic cap part (21) during the method, characterized in that the following method steps are carried out for the purpose of sealing the at least one lamp vessel (1) in the synthetic cap part (21):

the synthetic cap part (21) is fitted with at least one holder (210) for fastening the at least one lamp vessel (1) in the synthetic cap part (21), the dimensions of which holder are smaller than the corresponding external dimensions of a section (101, 102), to be fastened in the at least one holder (210), of the at least one lamp vessel (1), at least the section or sections (101, 102) of the at least one lamp vessel (1) is/are heated to a point which is at least as high as the softening point of the thermoplastic synthetic cap part material and less than the melting point of the lamp vessel material, the heated section or sections (101, 102) of the at least one lamp vessel (1) is/are inserted into the at least one holder (210), the synthetic material of the synthetic cap part (21) being softened in the region of the at least one holder (210) by contact with the heated section or sections (101, 102) of the at least one lamp vessel (1), and being displaced by the at least one lamp vessel (1), and the softened synthetic material is allowed to set.

2. Method according to claim 1, characterized in that the section or sections (101, 102) of the at least one lamp vessel (1) is/are heated to a point which is at least as high as the melting point of the thermoplastic synthetic cap part material.

3. Method according to claim 1, characterized in that before the heated section or sections (101, 102) or the at least one lamp vessel (1) is/are inserted into the at least one holder (210), the synthetic cap part (21) is preheated to a point which is above room temperature and below the softening point of the synthetic cap part material.

4. Method according to claim 1, characterized in that the softened synthetic material is cooled to allow it to set.

5. Method according to claim 4, characterized in that the cooling is performed by means of an air flow.

6. Method according to claim 1, characterized in that the displaced and solidified synthetic material forms a collar (212) in the form of a ring around the at least one lamp vessel (1).

7. Method according to claim 1, characterized in that the at least one lamp vessel (1) is provided with at least one indentation (103, 104), and the heated section or sections (101, 102) of the at least one lamp vessel (1) is/are inserted into the at least one holder (210) in such a way that at least one indentation (103, 104) is enclosed in the synthetic material after the softened synthetic material has been allowed to set.

8. Method according to claim 1, characterized in that the at least one lamp vessel (1) comprises at least one U-shaped tube (10), and the section or sections is/are the limbs (101, 102) of the at least one U-shaped tube (10), the at least one holder (210) is formed as a depression or-cutout in the synthetic cap part (21), and the diameter of the depression or of the cutout (210) is smaller than the outside diameter of the limbs (101, 102) of the at least one U-shaped tube (10).

9. Method according to claim 1, characterized in that the synthetic cap part (21) is formed as a cap of a pot-type lamp cap (2).

10. Fluorescent lamp having a lamp cap (2), and a discharge vessel (1) which has at least one U-shaped glass tube (10), a permanent connection existing between the discharge vessel (1) and the lamp cap (2), characterized in that the lamp cap (2) has at least one thermoplastic synthetic cap part (21) and the permanent connection is a fused bond between the thermoplastic synthetic cap part (21) and the limbs (101, 102) of the at least one U-shaped glass tube (10).

11. Fluorescent lamp according to claim 10, characterized in that the thermoplastic synthetic cap part (21) is designed as a cap through which the limbs (101, 102) of the at least one U-shaped glass tube (10) are led, and which has collars (212) which are ring-shaped on the inside and surround the limbs (101, 102) of the at least one U-shaped glass tube (10) in a self-closed fashion.

* * * * *